ELECTROMAGNETIC COUPLINGS

Original Filed Jan. 31, 1958 3 Sheets-Sheet 1

INVENTOR.
RALPH L. JAESCHKE
BY
Schramm, Kramer & Sturges
ATTORNEYS

ELECTROMAGNETIC COUPLINGS

Original Filed Jan. 31, 1958 3 Sheets-Sheet 2

INVENTOR.
RALPH L. JAESCHKE
BY
Schramm, Kramer & Stenger
ATTORNEYS

ELECTROMAGNETIC COUPLINGS

Original Filed Jan. 31, 1958 3 Sheets-Sheet 3

INVENTOR.
RALPH L. JAESCHKE
BY
Schanen, Kramer & Sturgeon
ATTORNEYS

United States Patent Office

Re. 25,516
Reissued Jan. 28, 1964

25,516
ELECTROMAGNETIC COUPLINGS

Ralph L. Jaeschke, Kenosha, Wis., assignor to Eaton Manufacturing Company, Cleveland, Ohio, a corporation of Ohio Original No. 2,973,850, dated Mar. 7, 1961, Ser. No. 712,451, Jan. 31, 1958. Application for reissue Feb. 2, 1962, Ser. No. 174,338
22 Claims. (Cl. 192—84)

Matter enclosed in heavy brackets [ ] appears in the original patent but forms no part of this reissue specification; matter printed in italics indicates the additions made by reissue.

This invention relates to electromagnetic couplings or clutches of the kind actuatable to an engaged condition for transmitting torque for driving or braking purposes and, as one of its objects, provides novel means in a device of this character for automatically maintaining or re-establishing a desired width of air gap beween the cooperatively engageable portions of the pole structure and armature member.

Another object of the invention is to provide an electromagnetic coupling or the like embodying novel air gap control means comprising a spring device having one portion in gripping engagement with a guide means, preferably though not necessarily a guide pin or the like, and a springable portion subject to flexing during the engaging and/or disengaging movement of the armature member.

A further object is to provide such an electromagnetic coupling or the like in which the effectiveness of the gripping action of the spring device on the guide means or guide pin is different for one direction of relative movement between the spring device and pin than for the other direction, so as to facilitate the shifting of the armature member in the direction to automatically re-establish the desired width of air gap.

Still another object is to provide an electromagnetic coupling of the character above indicated which includes abutment means effective between the armature member and spring device and carried by the latter, for causing an axial shifting of the spring device along the guide means or guide pin in the direction to re-establish the desired air gap width.

Additionally this invention provides novel means for preventing accidental shifting of an armature member of an electromagnetic coupling away from the pole structure due to vibration or the like, one such means comprising the engagement of a portion of a spring device with a keeper means on the armature member.

Other objects and advantages of this invention will be apparent in the following detailed description and in the accompanying sheets of drawings forming a part of this specification and in which, FIG. 1 is an axial section through an electromagnetic coupling or the like embodying the present invention, the view being taken substantially as indicated by section line 1—1 of FIG. 2;

Figure 1:
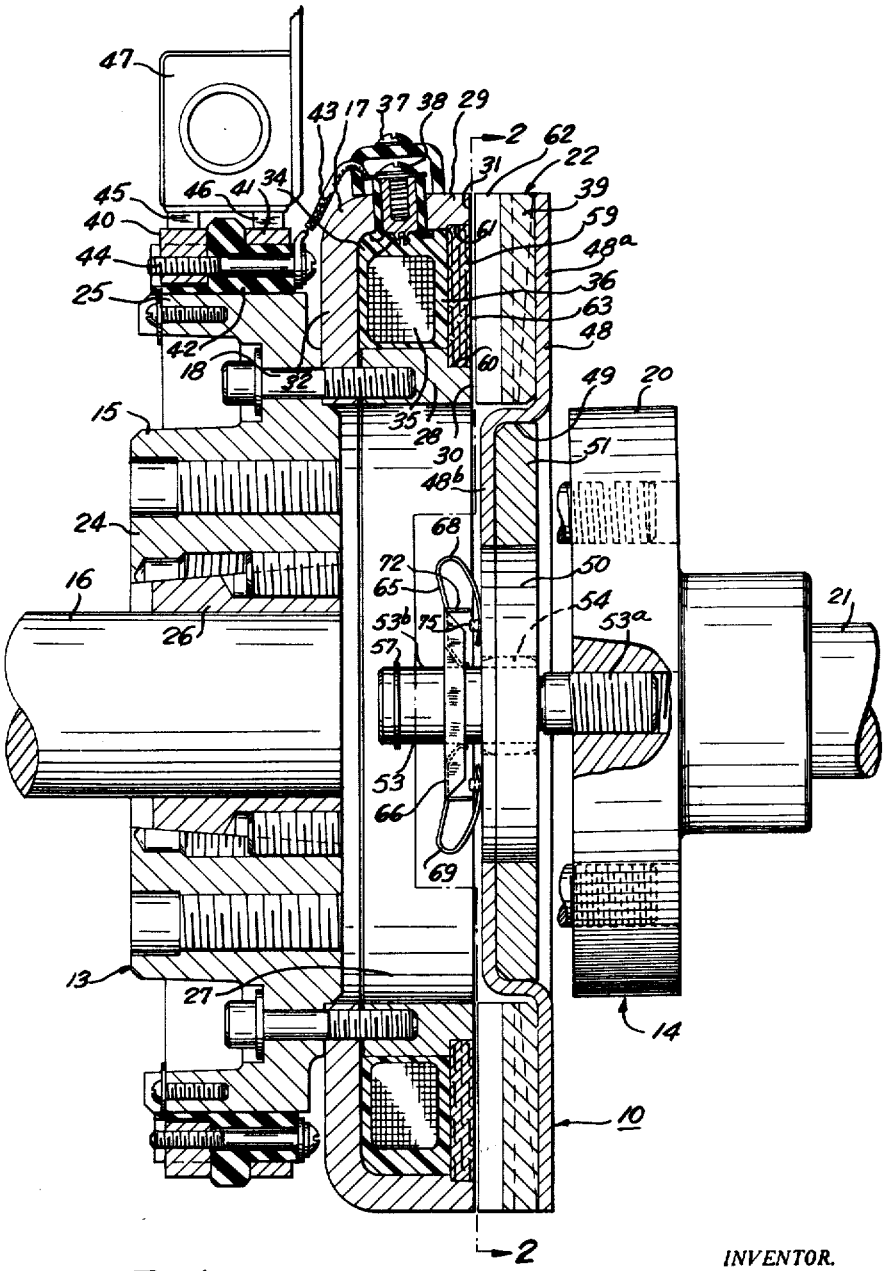
Figure 2:
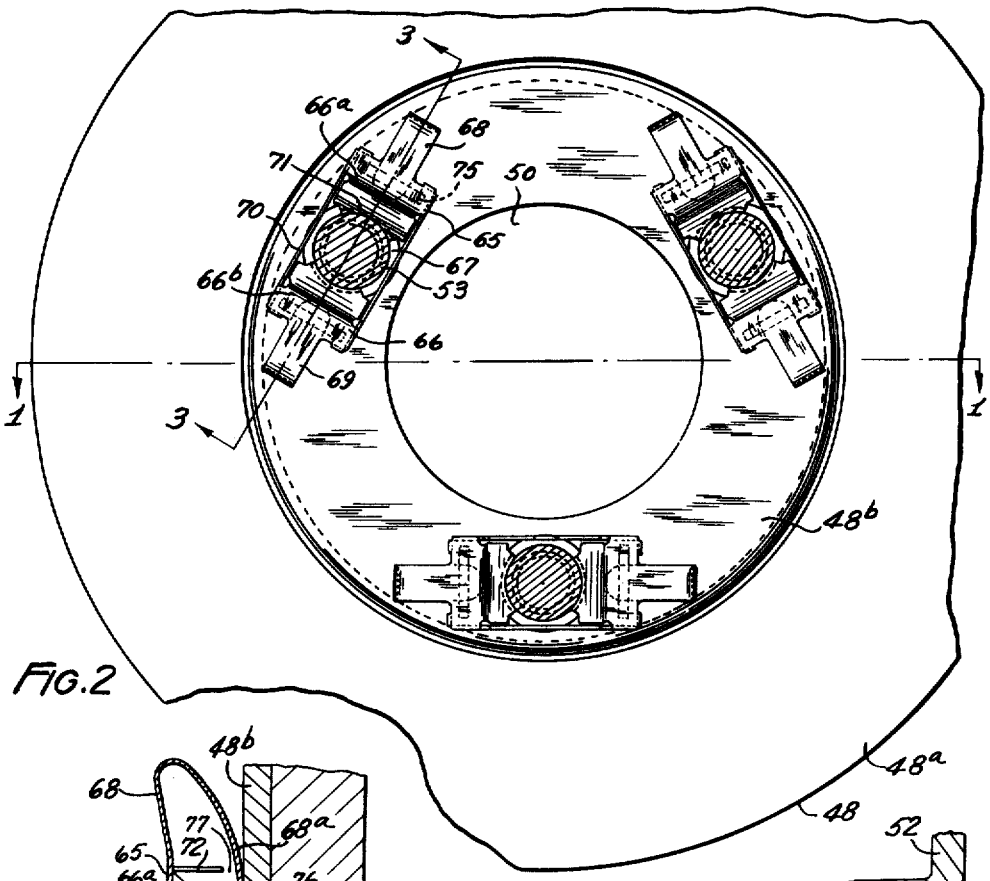
FIG. 2 is a transverse section through the coupling taken on section line 2—2 of FIG. 1.
Figure 3:
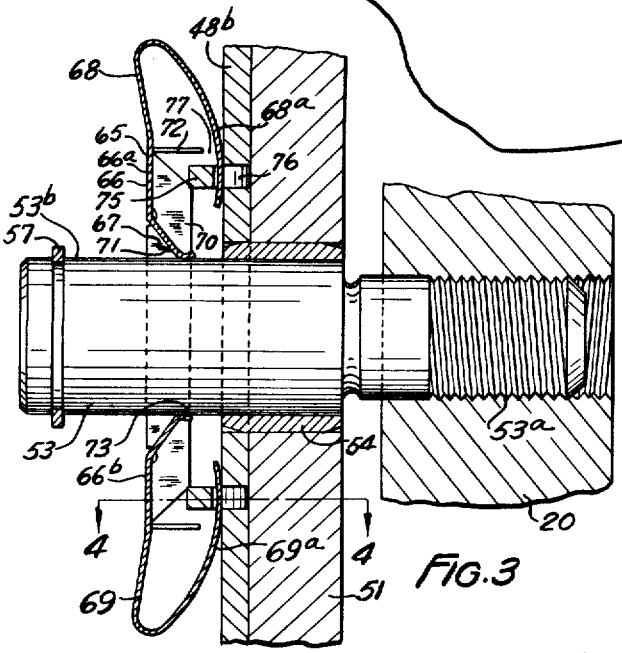
FIG. 3 is a larger scale partial axial section taken through one of the spring devices of the coupling as indicated by section line 3—3 of FIG. 2.
Figure 4:
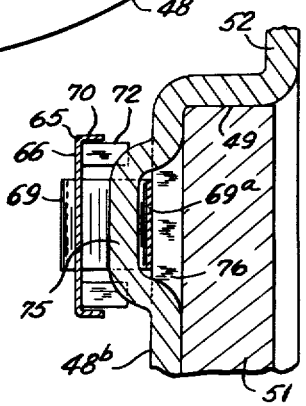
FIG. 4 is a fragmentary sectional view taken on section line 4—4 of FIG. 3 and showing the engagement of a springable arm of the spring device with a keeper means of the armature member.
Figure 5:
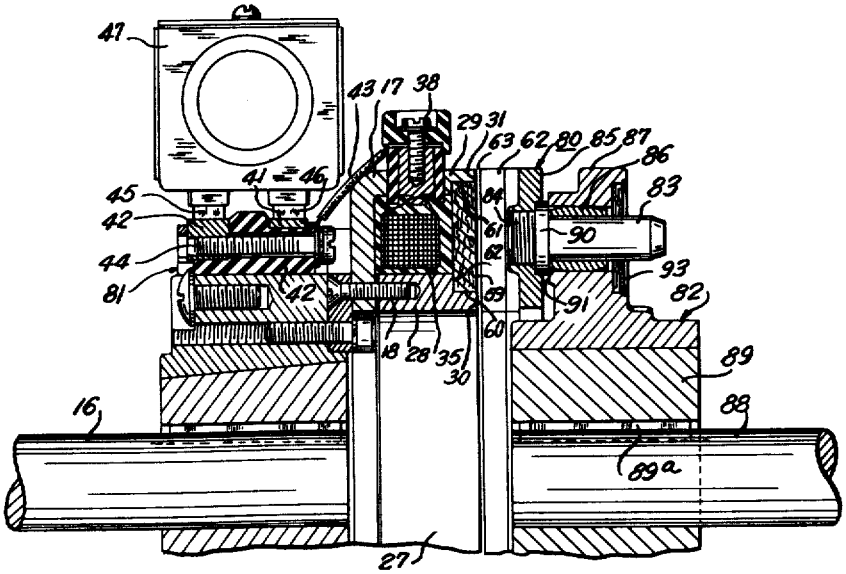
FIG. 5 is a partial axial section generally similar to that of FIG. 1 but showing another form of electromagnetic coupling embodying this invention.

As representing one preferred embodiment of the present invention, FIGS. 1 to 4 inclusive show an electromagnetic coupling 10 which comprises, in general, a pair of relatively rotatable co-operating coupling members 13 and 14. The coupling 10 can be used as a clutch for transmitting torque from one to the other of the coupling members 13 and 14 and is hereinafter described as such although, if desired, the coupling is also usable for braking purposes by having one of the clutch members serve as a nonrotatable holding member. When the coupling 10 is used as a clutch one of the coupling members, such as the coupling member 13, can be regarded as the power input member and the other coupling member, in this case the coupling member 14, is the driven of power output member.

The coupling member 13 comprises an annular drum-like member of carrier 15 which is connected with a rotatable power input shaft 16 to be driven thereby, and an annular pole structure 17 which is mounted on the carrier 15 as by means of axially extending screws 18. The coupling member 14 comprises a rotatable annular carrier 20 secured on a rotatable output shaft 21, and an annular armature member or assembly 22 mounted on the carrier 20 in the manner described hereinafter and axially shiftable into and out of a torque transmitting engagement with the annular pole structure 17.

The carrier 15 of the coupling member 13 is provided with a central hub portion 24 and an outer annular rim portion 25. The carrier 15 is adapted for attachment to the shaft 16 as by means of an axially shiftable wedge-shaped annular clamping member 26 located in the hub portion 24 and surrounding the shaft.

The annular pole structure 17 comprises a pair of inner and outer annular pole members of rings 28 and 29 having annular end faces thereof presented toward the armature member 22 as radially spaced inner and outer annular pole faces 30 and 31. The outer pole member 29 is of an angular cross-section shape and is disposed with the annular leg 32 thereof in a radially extending position with its inner edge portion lying adjacent the inner axial end of the annular pole member 28.

The pole members 28 and 29 together form a portion of a magnetic circuit as well as an annular channel-shaped recess 34. The pole members 28 and 29 are secured together in this relation and are also attached to the carrier 15, by means of the screws 18. The inner pole member 23 projects in an axial direction from the carrier 15 and extends around a central pocket or chamber 27.

The coupling member 13 also comprises an annular magnet coil 35 located in the annular recess 34 of the pole structure 17 for producing the energizing flux for the coupling. The coil 35 is positioned in the recess 34 and insulated from the pole members 28 and 29 by suitable filling and insulating material, such as the material 36 which may be an epoxy resin or the like. The ends of the coil 35 are connected with suitably insulated terminals which are mounted on the pole structure 17 and carry terminal screws 37 and 38.

Energizing current can be supplied to the coil 35 from any suitable source and, for this purpose, a pair of slip rings 40 and 41 are mounted on the rim portion 25 of the carrier 15 and are insulated therefrom by suitable insulating material 42. The terminals of the coil 35 are connected with the respective slip rings 40 and 41 as by means of suitable lead wires 43 and attaching screws 44. Current supply brushes 45 and 46 projecting from a brush holder or terminal box 47 cooperate with the slip rings 40 and 41.

The armature member 22 is here shown as having an outer ring-shaped portion formed by an annular group of segment pads 39 and of a radial width to extend in spanning relation across the annular pole faces 30 and 31 to co-operate with the latter in completing the magnetic circuit for the magnet coil 35. The armature member 22 also comprises a disk-shaped support member or armature plate 48 having a radially-edgewise disposed outer ring portion 48a carrying the segment pads 39 and an inner hub portion 48b provided with an axial annular recess 49 extending around a central opening 50. The armature member 22 also comprises a substantially flat filler ring 51 seated in the recess 49. The armature member 22 is mounted on the carrier 20 so that it will be rotatable with the carrier and the shaft 21, as well as being axially shiftable toward and away from the pole structure 17.

For thus mounting the armature mmber 22 on the carrier 20 the carrier is provided with axially extending guide means, in this case a group of axially extending circumferentially spaced guide pins 53, and the filler ring 51 is provided with inert bushings 54 which are slidable on the pins 53 to render the armature member 22 axially shiftable toward and away from the pole structure 17 while being rotatably connected with the carrier 20 by means of the pins. The guide pins 53 are here shown as having threaded stem portions 53a engaged in threaded openings of the carrier 20 and plain cylindrical stem portions 53b extending toward the coupling member 13 and into the pocket 27 of the latter. The bushings 54 are slidably retained on the guide pins 53 by snap rings 57 engaged in suitable grooves provided in the guide pins adjacent the free ends thereof.

In the mounting construction and arrangement just described for the armature member 22, it will be observed that each pin 53 and its associated bushing 54 co-operate as relatively slidable guide shaft and guide sleeve elements.

The pole structure 17 of the coupling member 13 is preferably provided with an annular friction lining 59 with which the armature member 22 co-operates when the latter is moved into its engaged relation with the pole structure upon energization of the coil 35. The friction lining 59 is preferably recessed into the pole structure 17 and is supported therein by internal annular seats 60 and 61 provided in the pole members 28 and 29. The adjacent face of the armature member 22 which is engageable with the pole structure 17 is preferably provided with transverse radial grooves or slots 62 formed in the segment pads 39 and extending thereacross to accommodate a flow of cooling air.

The adjacent faces of the pole structure 17 and the armature member 22 are separated by an intervening annular air gap 63 of a predetermined width, when the coil 35 is de-energized and the armature member is in its released or disengaged position shown in FIG. 1. The armature member 22 is axially shiftable away from the pole structure 17 by spring means comprising spring devices 65 located on the plain stem portions 53b of the axial guide pins 53.

The spring devices 65 are subject to loading flexure upon movement of the armature member 22 to its engaged condition relative to the pole structure 17 in response to energization of the coil 35 and, upon de-energization of the coil, the unloading flexure of the spring devices is effective to shift the armature member away from the pole structure to its disengaged position. The spring devices 65 also serve to retain the armature member 22 against accidental shifting away from the pole structure 17, due to vibration effects or other such causes.

The spring devices 65 are provided in suitable number, in this case three such devices located on the three guide pins 53 of the carrier 20, and are distributed in a balanced or symmetrical arrangement around the rotation axis of this carrier. The spring devices 65 are all of the same form and therefore only one of these devices need be described in detail.

As shown in the drawings, the spring device 65 comprises a generally flat body portion 66 having a central opening 67 through which the guide pin 53 extends and springable arms, in this case two such arms 68 and 69, connected with the body portion 66 and extending outwardly therefrom on opposite sides of the axis of the guide pin. The body portion 66 comprises two co-planar segments 66a and 66b lying on opposite sides of the central opening 67 and connected by a pair of edge flanges 70 formed by axially deflected edges of the body portion 66. The spring device 65 also comprises gripping elements 71 which, in this instance, are in the form of radial-lug portions on the body portion 66 at opposite sides of the opening 67, and abutment members or lugs 72 formed by pairs of axially deflected outer end portions of the body portion 66.

The spring device 65 is mounted on its associated guide pin 53 by the gripping engagement of the gripping elements 71 with the plain stem portion 53b. These gripping elements extend in an inclined relation to the axis of the guide pin 53 and have arcuate free end portions forming collar-like segments 73 which bear against the cylindrical outer surface of the guide pin. The gripping elements 71 are here shown as having an axially converging inclination in a direction axially of the guide pin 53 and away from the coupling member 13.

By reason of this inclination of the gripping elements 71, these elements will have a more effective gripping action to resist axial shifting of the spring device along the guide pin 53 in a direction away from the clutch member 13, which is the disengaging direction of movement of the armature member 22, than for axial shifting of the spring device along the guide pin in the opposite direction. In other words, the gripping elements 71 are more effective in preventing shifting of the spring device 65 along the pin 53 in a direction to increase the width of the air gap 63 and are less effective in preventing such shifting of the spring device in a direction to decrease the air gap width.

The arms 68 and 69 of the spring device 65 are of a relatively reduced width as compared with the body portion 66 so as to be resiliently flexible and constitute springable portions subject to flexure by or during the axial shifting of the armature member 22. The arms 68 and 69 have the outer end portions 68a and 69a thereof bent in a reverse direction, that is, to extend generally radially back toward the guide pin 53. By reason of this bent condition of the arms 68 and 69, these arms have a hook-like shape and the end portions 68a and 69a lie in an axially adjacent relation to the body portion 66 and are engageable by the adjacent surface of the hub portion 48b of the armature assembly 52.

The hub portion 48b of the armature assembly 52 is provided with keeper means for establishing an operative connection between the armature assembly and the spring devices 65 and which keeper means is here shown as comprising strap-like keepers 75 formed by axially deflected portions of the support member 48 and having associated keeper recesses 76 in which the free end portions 68a and 69a of the spring arms 68 and 69 are engaged. The pairs of abutment lugs 72 extend toward the hub portion 48b of the armature assembly so that the free ends of these lugs lie on opposite sides of the arm portions 68a and 69a and are engageable by the adjacent surface of the hub portion upon flexure of these arm portions for a sufficient amount to result in a closing or taking up of the intervening space 77.

From the construction above described for the spring devices 65 and the relation thereof to the armature assembly 52 and the guide pins 53, it will be seen that upon energization of the magnet coil 35 and resulting movement of the armature member 22 into engagement with the pole structure 17, the arms 68 and 69 of the spring devices will be flexed by the thrust of the hub portion 48b thereagainst. This produces a flexure loading of the arms 68 and 69 such that, upon de-energization of the coil 35, the arms will tend to assume an unloaded condition and will push the armature member 22 away from the pole structure to its released or disengaged position shown in FIG. 1. During the loading of the arms 68 and 69 in response to the energization of the coil 35, the gripping elements 71 normally prevent axial shifting of the spring devices 65 toward the left along their guide pins 53.

If there is any tendency for the armature member 22 to be accidentally shifted away from the pole structure 17 beyond the predetermined width of the air gaps 63 when the coil 35 has been de-energized, as by reason of vibrations or the like, the arms 68 and 69 will be subjected to a loading flexure in the opposite direction, that is, by a pulling force applied thereto by the keeper elements 75. The resistance of the arms 68 and 69 to such flexure by this pulling force causes the armature member 22 to be retained in the desired air gap relation to the pole structure 17. Axial shifting of the spring devices 65 toward the right along the guide pins 53 by such a pulling force applied to the arms 68 and 69 is resisted by the gripping engagement of the gripping elements 71 with the guide pins.

If wear occurs on the co-operatively engageable surface portions of the coupling members 13 and 14, such as wear of the friction lining 59 resulting in an increase in the width of the air gap 63, the spring devices 65 will function automatically to reposition the armature member 22 relative to the pole structure 17 to restore the air gap to its desired predetermined width. To explain the accomplishment of this automatic adjustment it is pointed out that the loading flexure of the arms 68 and 69, in response to energization of the coil 35, is a greater amount when the air gap 63 has increased in width and results in the abutment lugs 72 being engaged by the adjacent face of the hub portion 48b. The spring devices 65 are thereby pushed along the guide pins 53 toward the left as the armature member is pulled into its engaged position against the pole structure 17. This sliding of the spring devices 65 along the guide pins 53 repositions the spring devices thereon, so that when the coil 35 is de-energized and the armature member 22 is moved away from the pole structure 17 by the unloading of the spring arms 68 and 69, the air gap 63 will be restored to its desired predetermined width.

The gripping action of the elements 71 on the guide pins 53 is such that no appreciable amount of shifting of the spring devices toward the left on the guide pins takes place during normal flexing of the spring arms 68 and 69. If the width of the air gap 63 has increased and the spring arms 68 and 69 are subjected to a greater than normal loading as the result thereof, the gripping action of the elements 71 will be overcome and will permit the above-mentioned slidable adjustment of the spring devices on their guide pins 53 in response to such increased loading of the arms 68 and 69. The direction of the inclination of the gripping elements 71 is such as to facilitate the sliding adjustment of the spring devices 65 on the guide pins 53 in the direction to restore the air gap 63 to the desired predetermined width, and is also such as to have a relatively greater gripping action on the guide pins for always preventing accidental shifting of the armature member 22 in a direction away from the pole structure 17.

FIGS. 5 to 9 inclusive of the drawings show an electromagnetic coupling 80 which is usable in the same manner and for the same purposes as the coupling 10 and whose coupling member 81 is of a construction substantially identical with that of the coupling member 13 and, accordingly, the corresponding parts have been designated by the same reference characters. The coupling member 82 differs from the coupling member 14 in one respect in that the guide pins 83 have threaded portions 84 in fixed engagement in the armature member 85. The guide pins 83 are slidable in bushings 86 mounted in openings of a rotatable carrier 87 whose hub 89 is secured on the shaft 88 by means of a key 89*a*. In the construction just described, each pin 83 and its associated bushings 86 co-operate as relatively slidable guide shaft and guide sleeve elements.

The guide pins 83 are provided with abutment shoulders 90 which are engageable with annular abutment faces 91 of the carrier 87 and, in the initial or unwarn condition of the coupling 80, prevent axial shaifting of the armature member 85 away from the pole structure 17 beyond the distance corresponding with the desired predetermined width of the air gap 63. When wear has taken place at the co-operating faces of the pole structure 17 and armature member 85, the shoulders 90 will no longer be engageable by the armature member, but the desired predetermined width of the air gap 63 will be automatically maintained or restored by the functioning of the spring devices 93 as will be explained hereinafter.

Figure 7:
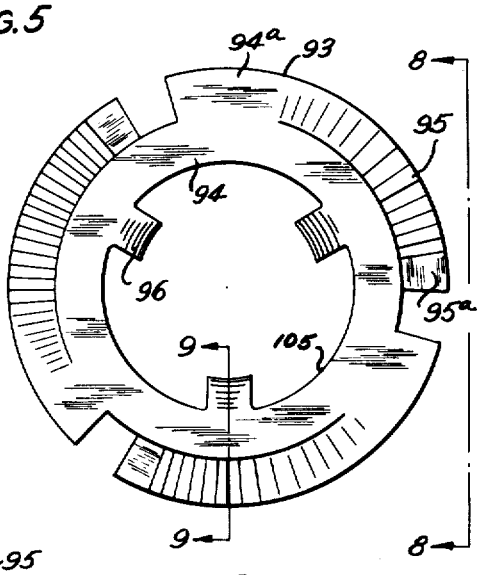
FIG. 7 is a plan view representing an enlarged scale showing of one of the spring devices of the electromagnetic coupling of FIG. 5.

The coupling 80 differs from the above-described coupling 10 in another respect in that the spring devices 93 are of a different form than the spring devices 65 and are provided in association with the guide pins 83 for producing the disengaging movement of the armature member 85 and for controlling the automatic re-establishment of the desired width of the air gap 63. The spring devices 93 are of ring-shaped form, as shown in FIG. 7, and each comprises a generally flat washer-shaped body portion 94 and arcuately extending springable portions or arms 95 carried by the body portion and disposed in a group extending therearound. The spring device 93 also comprises gripping elements in the form of substantially radially extending lugs or fingers 96 *separated by angularly spaced recesses 105* extending inwardly from the body portion 94 and engageable with the associated guide pin 83.

Figure 6:
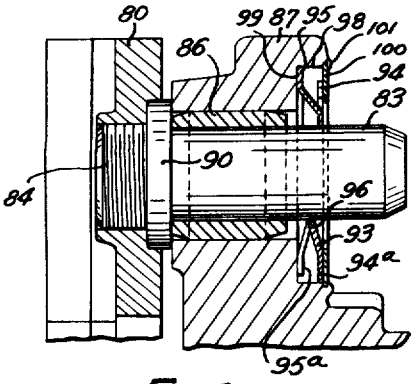
FIG. 6 is a fragmentary axial section corresponding with a portion of FIG. 5 but showing one of the guide pins and an associated spring device on a larger scale.
Figure 8:
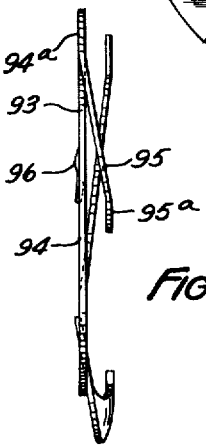
FIG. 8 is an edge view of the spring device of FIG. 7 when viewed as indicated by the directional line 8—8.

The spring arms 95 are formed by partially sheared portions of the body 94 so as to have their rear ends integrally connected with the outer segments 94a of the body portion while their outer ends 95a are disengaged from the body portion for a substantially free axial movement relative thereto. The outer end portions 95a are axially offset from the plane of the body portion 94, as shown in FIGS. 6 and 8, so as to be subject to loading flexure when the armature member 85 is moved to its engaged position against the pole structure 17 by the energization of the magnet coil 35.

To accommodate the spring devices 93, the carrier 87 is provided with axially facing counterbores 98 in the outer or remote side thereof and which counterbores are in a substantially coaxial relation to the guide bushings 86. The spring devices 93 are located in the counterbores 98 with the free end portions 95a of the spring arms 95 seating against the annular bottom surface or wall 99 of the counterbores. The spring devices 93 are retained in the counterbores 98 by flat retainer rings 100 which are locked in the counterbores in an axially spaced relation to the wall 99 by a deflected edge portion 101 of the carrier 87. The annularly spaced segments 94a of the spring devices are in seating engagement with the retainer rings 100 and the gripping elements 96 are in gripping engagement with the guide pins 83.

From the construction of the spring devices 93 as above described and their location in relation to the carrier 87 and the guide pins 83, it will be seen that when the armature member 85 is pulled against the pole structure 17 upon energization of the coil 35, the guide pins 83 will slide toward the left in the bushings 86 and, by reason of the gripping engagement of the elements 96 with the guide pins, this movement of the guide pins will cause the body portion 94 to be carried along with the guide pins to produce a loading flexure of the arcuate spring arms 95. When the coil 35 is de-energized, the spring arms 95 will tend to assume an unloaded condition and will flex in the opposite direction to apply a pulling force to the guide pin 83, through the gripping engagement of the elements 96 with the latter, to thereby move the armature 85 member away from the pole structure 17.

The gripping elements 96 have a more effective gripping action on the guide pins 83 for resisting movement of the guide pins through the central opening of the spring devices toward the right than for movement of the guide pins through the central opening toward the left. Normally no relative sliding between the guide pins 83 and the gripping elements 96 takes place but, if wear occurs in the coupling resulting in an increase in the width of the air gap 63 the loading of the spring arms 95 will be greater than normal and the gripping engagement of the elements 96 on the guide pins will be overcome and the spring devices 93 will permit relative sliding of the guide pins 83 toward the left for restoring the air gap to the desired predetermined width.

Figure 9:
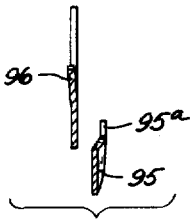
FIG. 9 is a partial transverse section taken through the spring device of FIG. 7 as indicated by section line 7—7 thereof.

The gripping elements 96 are inclined relative to the axis of the guide pins 83 so as to have a converging inclination toward the armature member 85 as shown in FIGS. 6, 8 and 9. This convergent inclination of the gripping elements 96 in this direction permits the guide pins 83 to move more readily toward the left in sliding engagement with the gripping elements than in the opposite direction so that, whenever the arcuate spring arms 95 are subjected to the abnormal flexure on account of an increase having occurred in the width of the air gap 63, the gripping engagement of the elements 96 on the guide pins 83 will no longer prevent sliding of the guide pins relative to these elements and thereupon a sufficient sliding of the guide pins relative to the gripping elements will take place to reposition the armature member 85 relative to the pole structure 17 to restore the air gap to its desired predetermined width. The gripping engagement of the elements 96 on the guide pins 83 is always sufficient to cause shifting of the armature member 85 away from the pole structure 17 by the unloading flexure of the spring arms 95 when the coil 35 is de-energized.

From the accompanying drawings and the foregoing detailed description it will now be readily understood that this invention provides a novel construction for an electromagnetic coupling or the like by which the spring means of the coupling will be automatically effective to reposition the armature member, in the event of the occurrence of wear, to restore the air gap to its desired predetermined width. It will now also be seen that this invention has provided for use of the spring means of the magnetic coupling for preventing accidental movement of the armature member away from its associated pole structure. Additionally, it will now be understood that this invention has provided a novel electromagnetic coupling or the like in which these characteristics have been achieved by the use of spring means of a very simple and practical form.

Although the electromagnetic couplings of this invention have been illustrated and described herein to a somewhat detailed extent it will be understood, of course, that the invention is not to be regarded as being limited correspondingly in scope but includes all changes and modifications coming within the terms of the claims hereof.

Having described my invention, I claim:

[1. In an electromagnetic coupling or the like, a rotatable pole structure having energizing magnet coil means associated therewith for energization thereof, a rotatable armature for co-operation with said pole structure and being axially shiftable into a torque transmitting coupled relation thereto in response to energization of said coil means, said pole structure and armature being conjointly rotatable during said coupled relation and relatively rotatable when said coupled relation is released, shaft means connected with said pole structure and armature and comprising driving and driven shaft members having a common rotation axis, means providing a rotative drive connection between said armature and its associated shaft member including guide means comprising relatively slidably co-operating guide sleeve and guide shaft elements for guiding the axial movement of said armature, and a combined armature return and air gap adjusting spring having outer and inner springable and gripping portions disposed in an offset relation in a direction transversely of said rotation axis, said outer springable portion being subject to loading flexture in response to axial movement of said armature into said coupled relation with said pole structure, said spring being mounted on said guide shaft element by a gripping engagement of said inner gripping portion therewith, said gripping engagement being resistant to relative sliding between said inner gripping portion and said guide shaft element and the resistance to said relative sliding being greater than the resistance of said springable portion to said loading flexture.]

[2. In an electromagnetic coupling or the like, a rotatable pole structure having energizing magnet coil means associated therewith for energization thereof, a rotatable armature for co-operation with said pole structure and being axially shiftable into a torque transmitting coupled relation thereto in response to energization of said coil means, said pole structure and armature being conjointly rotatable during said coupled relation and relatively rotatable when said coupled relation is released, a torque connection and armature support means for said armature including guide means comprising a group of slidably co-operating pin and sleeve elements for guiding the axial movement of said armature, and spring means for causing disengaging movement of said armature relative to said pole structure in response to de-energization of said coil means comprising spring devices located on the respective guide pin elements, each of said spring devices comprising gripping means in gripping and slidable engagement with the associated pin element and yieldable arms subject to loading flexure in response to axial movement of said armature into said coupled relation with said pole structure, said spring devices being mounted on their associated pin elements by the gripping engagement of their gripping means therewith and said gripping engagement being resistant to relative sliding between said gripping means and pin elements with a force greater than the resistance of said arms to said loading flexure.]

[3. An electromagnetic coupling or the like as defined in claim 2 in which said gripping means of each spring device comprises spaced gripping portions in a substantially balanced distribution around the axis of said associated pin element, and wherein said arms are located outward of said gripping portions and are disposed in balanced distribution around said axis.]

[4. In an electromagnetic coupling or the like, a rotatable pole structure having energizing magnet coil means associated therewith for energization thereof, a rotatable armature for cooperation with said pole structure and being axially shiftable into a torque transmitting coupled relation thereto in response to energization of said coil means, said pole structure and armature having a common rotation axis and being conjointly rotatable during said coupled relation and relatively rotatable when said coupled relation is released, a torque connection and armature support means for the armature including guide means for guiding the axial movements of said armature, said guide means comprising relatively slidably co-operating guide sleeve and guide shaft elements, and a combined armature return and air gap adjusting spring having outer and inner springable and gripping portions disposed in an offset relation in a direction transversely of said rotation axis, said outer portion comprising springable arms subject to flexure loading in response to axial movement of said armature into said coupled relation with said pole structure, said spring being mounted on said guide shaft element by a gripping engagement of said inner gripping portion therewith, the expansive action of said arms being effective to move said armature away from said pole structure upon de-energization of said coil means, the gripping engagement of said gripping portion with said guide shaft element providing a holding force effective to substantially prevent relative axial sliding therebetween for a predetermined loading of said arms and ineffective to prevent such axial sliding for loading of said arms in excess of said predetermined loading.]

[5. In an electromagnetic coupling or the like, a rotatable pole structure having energizing magnet coil means associated therewith, a rotatable armature spaced from said pole structure by an intervening air gap of predetermined width and being axially shiftable into a torque transmitting coupled relation with said pole structure in response to energization of said coil means, said pole structure and armature having a common rotation axis and being conjointly rotatable during said coupled relation and relatively rotatable when said coupled relation is released, a torque connection and armature support means for the armature including guide pin means comprising a group of pins for guiding the axial movement of said armature, and spring means for causing disengaging movement of said armature relative to said pole structure in response to de-energization of said coil means comprising spring devices located on the respective guide pins, each of said spring devices having a gripping means comprising spaced gripping portions and also having yieldable arms subject to loading in response to axial movement of said armature into said coupled relation, said spring devices being mounted on their associated pins by the gripping engagement of said gripping portions with said associated pins and said gripping engagement providing a holding force effective to substantially prevent axial sliding between said gripping portions and associated pins for all loadings of said arms up to a predetermined value, said gripping portions and pins being relatively slidable for automatically re-establishing the predetermined air gap width in response to loading of said arms in excess of said predetermined value.]

6. In an electromagnetic coupling or the like, a rotatable pole structure having energizing magnet coil means thereon, a rotatable armature for cooperation with said pole structure and being axially shiftable into a torque transmitting coupled relation thereto in response to energization of said coil means, said pole structure and armature having a common rotation axis and being conjointly rotatable during said coupled relation and relatively rotatable when said coupled relation is released, a torque connection and armature support means for the armature including guide pin means for guiding the axial movement of said armature, spring means comprising a body spaced relative to said armature and having gripping portions in gripping and slidable engagement with said pin means and springable arm portions subject to loading in response to axial movement of said armature into said coupled relation, the expansive action of said springable arm portions being effective to move said armature away from said pole structure upon de-energization of said coil means, and thrust elements extending into the space between said armature and body and effective to transmit thrust to the latter for causing sliding of said gripping portions on said pin means.

7. An electromagnetic coupling or the like as defined in claim 6 in which said thrust elements comprise projection means carried by said body and extending toward said armature for engagement by the latter.

8. A clutch or the like comprising, a rotatable pole structure carrying an energizing magnet coil means, a rotatable armature axially shiftable relative to said pole structure, co-operable faces on said pole structure and armature and separated by an intervening air gap, friction means effective between said pole structure and armature upon axial shifting of the latter into a coupled relation with the pole structure by the energization of said coil means, said pole structure and armature having a common rotation axis and being conjointly rotatable during said coupled relation and relatively rotatable when said coupled relation is released, a torque connection and armature support means for the armature including a group of guide pins for guiding the axial movement of said armature, spring means for causing disengaging movement of said armature relative to said pole structure in response to de-energization of said coil means comprising spring devices located on said pins, each of said spring devices having a gripping means in gripping engagement with the associated pin and springable arm means subject to loading in response to movement of the armature into said coupled relation with said pole structure, said gripping means having a gripping action on said associated pin for resisting separating movement of said armature away from said pole structure beyond a given separating movement resulting from the unloading of said springable means, said gripping means comprising radial-lug portions of the spring device whch are inclined in the direction of the axis of the associated pins so that the gripping action on said associated pins is increasingly effective in response to separating movement of said armature beyond said given separating movement.

9. In a clutch or the like, a rotatable pole structure carrying an energizing magnet coil means, a rotatable armature axially shiftable relative to said pole structure, co-operable friction faces on said pole structure and armature and separated by an intervening air gap of predetermined width, a group of guide pins for guiding the axial movement of said armature and being rotatable therewith, keeper elements on said armature, and spring devices each comprising a body provided with a gripping means and mounted on one of said pins and a flexible arm projecting from said body and having a co-operating engagement with one of said keeper elements for connecting said armature with said arm, said arm being subject to loading flexure by springing thereof in one direction in response to the movement of said armature into engaged relation with said pole structure and being springable in the opposite direction for resisting movement of said armature away from said pole structure beyond the predetermined air gap width, said spring devices being mounted on their associated pins by a gripping and slidable engagement of said gripping means with said associated pins, said gripping engagement being resistant to relative sliding between the spring devices and associated pins with a force greater than the resistance of the arms to loading flexure, said keeper elements providing keeper recesses and the arms of said spring devices having free end portions engaged in said keeper recesses.

10. A clutch or the like as defined in claim 9 in which said keeper elements provide keeper recesses, and in which the arms of said spring devices are of hook-like shape and are engaged in said keeper recesses.

11. In a clutch or the like; a rotatable pole structure carrying an energizing magnet coil means; a rotatable armature axially shiftable relative to said pole structure; co-operable friction faces on said pole structure and armature and separated by an intervening air gap; a group of guide pins for guiding the axial movement of said armature and being rotatable therewith; keeper elements on said armature and each providing a keeper recess; spring devices each comprising a body mounted on one of said pins and a flexible arm projecting from said body and engaged in a keeper recess; said arm being springable in one direction for a predetermined loading flexure of the arm in response to a normal movement of said armature toward a condition of coupled engagement with said pole structure and being springable in the opposite direction for moving said armature away from, and retaining the latter in a predetermined air gap relation to, said pole structure upon de-energization of said coil means; and gripping means on said body and having gripping engagement with said one pin for resisting sliding of the spring device thereon upon loading flexure of said arm in either of said directions; said gripping engagement being ineffective to prevent sliding of said spring device on its associated pin upon loading flexure of said arm in excess of said predetermined loading flexure for automatically re-establishing said predetermined air gap width when wear of said friction faces has occurred.

12. A clutch or the like as defined in claim 11 in which said gripping means is inclined in the direction of the axis of said one pin and said gripping engagement provides greater resistance to sliding of the spring device in one direction along said one pin than in the opposite direction.

13. In a clutch or the like; a rotatable pole structure energizable by a magnet coil means; rotatable means adjacent said pole structure; an armature rotatable with the rotatable means and axially movable to and from torque transmitting engagement with said pole structure; co-operating guide elements on said rotatable means and armature for guiding the axial movement of said armature; and spring means effective between said rotatable means and armature for moving the latter away from said pole structure upon de-energization of said coil means and comprising a one-piece plate-type annular spring having a central opening and an annularly continuous washer portion extending therearound, and also having flexible arms extending arcuately around and integrally connected at one end thereof with said washer portion; said arms having free end portions deflected out of the plane of said washer portion.

14. In a clutch of the like, a rotatable pole structure energizable by a magnet coil means, a rotatable member adjacent said pole structure and having guide openings therein, an armature member rotatable with said rotatable member and having pins slidable in said guide openings for axial movement of said armature member to and from torque transmitting engagement with said pole structure, and annular spring devices effective between said rotatable member and said armature member, means engaging peripheral portions of said spring devices for mounting the spring devices on said rotatable member adjacent said guide openings and in surrounding relation to said pins, said spring devices having gripping portions in gripping engagement with said pins for connecting the spring devices with the latter and springable arms deflectable against said rotatable member during movement of said armature member toward said torque transmitting engagement.

15. A clutch or the like as defined in claim 14 in which said gripping portions are effective to prevent sliding of said pins relative to the gripping portions for all deflection loadings of said arms below a predetermined value, said pins being slidable relative to said gripping portions upon deflection loading of said arms above said predetermined value for restoring said air gap to said predetermined width.

16. In a clutch or the like; a rotatable pole structure energizable by a magnet coil means; a rotatable member adjacent said pole structure and having guide openings therein; an armature member rotatable with said rotatable member and having pins slidable in said guide openings for axial movement of said armature member to and from torque transmitting engagement with said pole structure; and ring shaped spring devices effective between said rotatable member and said armature member and each spring device having an annularly continuous body, means engaging portions of the bodies of said spring devices for mounting the spring devices on said rotatable member in surrounding relation to said pins; said spring devices having radial-lug gripping portions in gripping engagement with the pins for connecting the spring devices with the latter, and springable arms connected at one end thereof with said bodies and extending arcuately around the pins and deflectable against said rotatable member during movement of said armature member toward said torque transmitting engagement.

17. A clutch or the like as defined in claim 16 in which said rotatable member has counterbores therein in associated relation to said guide openings and said spring devices are located in said counterbores.

18. A clutch or the like as defined in claim 16 in which the radial-lug gripping portions of said spring devices are axially inclined toward said pole structure.

19. In a clutch or the like; a rotatable pole structure carrying an energizable magnet coil means; a rotatable member adjacent said pole structure and having guide openings therein; an armature member rotatable with said rotatable member and having pins slidable in said guide openings for axial movement of said armature member to and from torque transmitting engagement with said pole structure; annular spring devices effective between said rotatable member and said armature member and each spring device having an annularly continuous body, means engaging portions of the bodies of said spring devices for mounting the spring devices on said rotatable member adjacent said guide openings and in surrounding relation to said pins; said spring devices having radial-lug gripping portions in gripping engagement with said pins for connecting the spring devices with the latter, and springable arms connected at one end thereof with said bodies and being deflectable against said rotatable member during movement of said armature member toward said torque transmitting engagement; and co-operable abutment elements effective between said rotatable member and said armature member for limiting the extent of movement of the latter away from said pole structure.

20. A dual-purpose armature retracting and gap adjusting spring for use in an electromagnetic clutch or the like, comprising a body having a central opening adapted to receive a cylindrical member, radial-lug gripping elements formed by inner portions of said body and lying in an annular series around the periphery of said opening for gripping engagement with said member, and springable arms formed by outer portions of said body, said arms having inner ends connected with said body and also having free outer end portions extending inwardly toward said opening.

21. A dual-purpose armature retracting and gap adjusting spring for use in an electromagnetic clutch or the like, comprising an annular body having a central opening adapted to receive a cylindrical member, radial-lug gripping elements formed by inner portions of said body and lying in an annular series around the periphery of said opening for gripping and slidable engagement with said member, and curved springable arms formed by outer portions of said body and connected at one end thereof with the body and also having free end portions lying in a plane offset from the plane of said body, said springable arms extending circumferentially of said body and said free end portions being movable in the direction in which the axis of said central opening extends in response to springing of said arms.

22. A dual-purpose armature retracting and gap adjusting spring for use in an electromagnetic clutch or the like, comprising a body having a central opening adapted to receive a cylindrical member, gripping elements formed by inner portions of said body and lying in an annular series around the periphery of said opening for gripping and slidable engagement with said member, and springable arms formed by outer portions of said body and having free end portions lying in a plane offset from the plane of said body, said springable arms being reversely bent and disposed with their free end portions extending inward toward said opening, said spring also comprising abutment elements projecting from said body on opposite sides of said opening and extending in the direction of the central axis of said opening.

*23. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial sliding along the member into and out of abutment with the fixed ring, an annulus of resilient sheet metal engaging said member and having an axially projecting inner flange, a plurality of angularly spaced recesses interrupting said flange and extending outwardly partially across the annulus, whereby to form a plurality of radially flexible sectors frictionally gripping said other ring, and a plurality of tangentially projecting angularly spaced resilient fingers rigid with said annulus and bearing at their free ends against said member, said fingers being flexed during magnetic attraction of said rings together under said force and acting upon release thereof to separate said rings by a predetermined gap.*

*24. A magnetic torque producing device as defined in claim 23 in which said annulus is a continuous rigid ring.*

*25. A magnetic torque producing device as defined in claim 23 including an abutment acting positively to limit the extent of separation of said rings by said fingers.*

*26. In a magnetic torque producing device, the combination of two relatively rotatable rings adapted to be drawn into axial gripping engagement, magnetic means for drawing said rings into abutment under a predetermined force, a rotatable member carrying one of said rings in axially fixed relation, another rotatable member supporting the other ring for axial movement into and out of abutment with the fixed ring, an annulus of resilient sheet metal having a plurality of circumferentially spaced radially flexible sectors projecting axially from its inner periphery, and a plurality of tangentially projecting angularly spaced resilient fingers rigid with said annulus, said fingers and radially flexible sectors coacting under flexure between said movable ring and said other rotatable supporting member during magnetic attraction of said rings together to separate said rings by a predetermined gap upon release of said magnetic attraction.*

*27. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial movement into and out of abutment with the fixed ring, an annulus of resilient sheet metal having a plurality of circumferentially spaced radially flexible sectors projecting axially from its inner periphery, and a plurality of resilient fingers coupled together in circumferentially spaced relation with said annulus and extending tangentially and axially therefrom, said tangential fingers and said radially flexible sectors coacting through said annulus under flexure between said other movable ring and its supporting member during magnetic attraction of said rings together to separate said rings by a predetermined gap upon release of said magnetic attraction.*

References Cited in the file of this patent or the original patent

UNITED STATES PATENTS

| | | |
|---|---|---|
| 1,523,413 | Gent | Jan. 20, 1925 |
| 2,395,772 | Winther | Feb. 26, 1946 |
| 2,568,858 | Kovac | Sept. 25, 1951 |
| 2,695,695 | Gilfillan et al. | Nov. 30, 1954 |
| 2,705,058 | Harter | Mar. 29, 1955 |
| 2,754,717 | Becker | July 17, 1956 |
| 2,780,495 | Brown | Feb. 5, 1957 |
| 2,808,917 | Harter | Oct. 8, 1957 |
| 2,841,258 | Jewell | July 1, 1958 |
| 2,876,879 | Maurice et al. | Mar. 10, 1959 |
| 2,965,207 | Snyder | Dec. 20, 1960 |